United States Patent
Citriniti et al.

(10) Patent No.: US 12,449,345 B2
(45) Date of Patent: Oct. 21, 2025

(54) OFFLINE MEASUREMENT OF HONEYCOMB BODY FILTRATION EFFICIENCY

(71) Applicant: CORNING INCORPORATED, Corning, NY (US)

(72) Inventors: Joseph Henry Citriniti, Corning, NY (US); Curtis Robert Fekety, Corning, NY (US); Christopher Lane Kerr, Tioga, PA (US); Stefan Wolfgang Kramel, Regensburg (DE); Huiqing Wu, Shanghai (CN); Xinfeng Xing, Shanghai (CN)

(73) Assignee: CORNING INCORPORATED, Corning, NY (US)

( * ) Notice: Subject to any disclaimer, the term of this patent is extended or adjusted under 35 U.S.C. 154(b) by 426 days.

(21) Appl. No.: 18/008,510

(22) PCT Filed: Jul. 8, 2020

(86) PCT No.: PCT/CN2020/100781
§ 371 (c)(1),
(2) Date: Dec. 6, 2022

(87) PCT Pub. No.: WO2022/006767
PCT Pub. Date: Jan. 13, 2022

(65) Prior Publication Data
US 2023/0213433 A1    Jul. 6, 2023

(51) Int. Cl.
*G01N 15/1434*    (2024.01)
*G01N 15/1404*    (2024.01)
*G01N 15/14*    (2006.01)

(52) U.S. Cl.
CPC ..... *G01N 15/1434* (2013.01); *G01N 15/1404* (2013.01); *G01N 2015/1486* (2013.01)

(58) Field of Classification Search
CPC ........... G01N 15/1434; G01N 15/1404; G01N 2015/1486; G01N 15/0826;
(Continued)

(56) References Cited

U.S. PATENT DOCUMENTS 4,883,507 A * 11/1989 Rey ..................... A61K 9/2095
55/528
5,611,831 A * 3/1997 Matsuoka .......... B01D 39/2017
55/501
(Continued)

FOREIGN PATENT DOCUMENTS

CN    101738362 A    6/2010
CN    102325574 A    1/2012
(Continued)

OTHER PUBLICATIONS

European Patent Application No. 20944390.2, Extended European Search Report dated Dec. 1, 2023, 9 pages , European Patent Office.
(Continued)

*Primary Examiner* — Abdullahi Nur
(74) *Attorney, Agent, or Firm* — Kevin M. Able

(57) ABSTRACT

Apparatus and methods are disclosed which are capable of being used to determine filtration efficiency of a filter body even in a clean state. Methods of determining a filtration efficiency of a filter including forcing an inlet flow comprised of a gas (such as air) flow into the inlet end of the filter at a set flow rate, introducing particles such as smoke particles into the inlet flow, and optically counting the number of particles entering and exiting the filter during a sampling event, such as with diffraction based optical particle counters positioned upstream and downstream of the filter. Preferably the gas flow is a soot-free flow stream which does not load the honeycomb filter body with contaminants that need to be removed or burned out. The filter (Continued)

body can thus remain in an essentially clean state even after testing its filtration efficiency.

20 Claims, 10 Drawing Sheets

(58) Field of Classification Search
CPC ..... G01N 2015/0046; G01N 2015/084; G01N 2015/0846; B01D 46/442; B01D 46/446; B01D 46/448; B01D 2273/18; Y02T 10/40
See application file for complete search history.

(56) References Cited

U.S. PATENT DOCUMENTS

| | | | |
|---|---|---|---|
| 5,620,490 A * | 4/1997 | Kawamura | F01N 9/002 55/282.3 |
| 6,327,893 B1 | 12/2001 | Choi | |
| 6,375,695 B2 * | 4/2002 | Machida | F01N 3/0233 55/484 |
| 7,008,465 B2 * | 3/2006 | Graham | B01D 39/2017 55/DIG. 35 |
| 11,117,124 B2 | 9/2021 | Beall et al. | |
| 2007/0119134 A1 | 5/2007 | Beall et al. | |
| 2010/0180561 A1 | 7/2010 | Beall et al. | |
| 2010/0180772 A1 | 7/2010 | Beall et al. | |
| 2011/0056273 A1 * | 3/2011 | Gorbunov | B05C 3/005 118/716 |
| 2013/0203264 A1 * | 8/2013 | Liu | B01D 39/2044 55/482 |
| 2019/0262757 A1 | 8/2019 | Car et al. | |
| 2020/0101442 A1 | 4/2020 | Kayama | |
| 2020/0370453 A1 | 11/2020 | Gunasekaran et al. | |
| 2021/0179501 A1 | 6/2021 | Lewis et al. | |
| 2021/0189930 A1 * | 6/2021 | Sugawara | B01D 46/2482 |
| 2021/0197105 A1 | 7/2021 | Gu et al. | |
| 2021/0205750 A1 | 7/2021 | Liu et al. | |
| 2021/0347702 A1 | 11/2021 | Citriniti et al. | |
| 2021/0354071 A1 | 11/2021 | Addiego et al. | |
| 2022/0325644 A1 | 10/2022 | Tandon | |

FOREIGN PATENT DOCUMENTS

| | | | | |
|---|---|---|---|---|
| CN | 102325970 A | 1/2012 | | |
| CN | 102625727 A | 8/2012 | | |
| CN | 105408731 A | 3/2016 | | |
| CN | 105954176 A | 9/2016 | | |
| CN | 108290102 A | 7/2018 | | |
| CN | 108367225 A | 8/2018 | | |
| CN | 110185519 A | 8/2019 | | |
| CN | 110966065 A | 4/2020 | | |
| CN | 111148890 A | 5/2020 | | |
| DE | 60318937 T2 * | 1/2009 | ......... | B01D 46/2422 |
| JP | 07-033992 B2 | 4/1995 | | |
| WO | 2019/089806 A1 | 5/2019 | | |
| WO | 2021/217389 A1 | 11/2021 | | |

OTHER PUBLICATIONS

Liu et al; "Gasoline Particulate Filter Efficiency and Backpressure at Very Low Mileage"; SAE Technical Paper; 2018-01-1259, 2018, 9 Pages.
Liu et al; "Using Artificial Ash to Improve GPF Performance at Zero Mileage"; SAE Technical Paper, 2019-01-0974, 2019, 7 Pages.
Tandon et al; "Measurement and Prediction of Filtration Efficiency Evolution of Soot Loaded Diesel Particulate Filters"; Chemical Engineering Science, 65 (2010) 4751-4760.
Zhong et al; "Measurement and Prediction of Filtration Efficiency Evolution of Soot Loaded Diesel Particulate Filters"; SAE International; 2012-01-0363, 2012; 15 Pages.
Chinese Patent Application No. 202080102063.1 , Office Action dated Mar. 12, 2025, 4 pages (English Translation only), Chinese Patent Office.

* cited by examiner

|  | Acceptable Level | MSA results (300x8 GC 1.0 parts) | |
|---|---|---|---|
|  |  | 4.055" OD | 5.2" OD |
| % GRR to study variation | <10% | 8.78% | 11.10% |
| Number of Distinct Categories | >5 | 15 | 12 |
| Measurement Capability (+/- $2\sigma_{GRRTotal}$) | <2% | 0.68% | 0.70% |

FIG. 7

OFFLINE MEASUREMENT OF HONEYCOMB BODY FILTRATION EFFICIENCY

CROSS-REFERENCE TO RELATED APPLICATIONS

This application claims the benefit of priority under 35 U.S.C. § 365 of International Patent Application Serial No. PCT/CN2020/100781 filed on Jul. 8, 2020, the content of which is relied upon and incorporated herein by reference in its entirety.

TECHNICAL FIELD

Embodiments of the present disclosure generally relate to methods and apparatus for offline measurement of filtration efficiency of honeycomb bodies.

BACKGROUND

Particulate filters, for example, diesel particulate filters and gasoline particulate filters (GPFs), filter particulates from the exhaust stream from engines such as automotive vehicles burning diesel and gasoline fuel, respectively. Evaluation of the filtration efficiency of a particulate filter which is in a "clean state", i.e. pristine or containing a very small amount of soot and/or ash and/or other particulate matter, would be valuable to engine or vehicle manufacturers.

Accordingly, there is a need for alternative methods and apparatus to evaluate or achieve a targeted filtration efficiency when the particulate filter is in a clean state.

SUMMARY

One or more embodiments of the disclosure are directed to methods of determining a filtration efficiency of a filter comprised of a porous wall portion, the filter having a longitudinal axis extending from an inlet end to an outlet end, and an outer peripheral portion extending parallel to the longitudinal axis and surrounding the porous wall portion, the method comprising: sealing the outer peripheral portion to prevent gas flow across an outermost surface of the outer peripheral portion, forcing an inlet flow comprised of a gas (such as air) flow into the inlet end of the filter at a set flow rate, introducing particles such as smoke particles into the inlet flow, and optically counting the number of particles entering and exiting the filter during a sampling event, such as with diffraction based optical particle counters positioned upstream and downstream of the filter. Preferably the gas flow is a soot-free flow stream which does not load the honeycomb filter body with contaminants that need to be removed or burned out. The filter body can thus remain in an essentially clean state even after testing its filtration efficiency.

In some embodiments, the particles are smoke particles.

In some embodiments, optically counting the number of particles entering and exiting the filter during a sampling event is accomplished with diffraction based optical particle counters positioned upstream and downstream of the filter.

Additional embodiments of the disclosure are directed to a method are disclosed herein.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 7 show a low pooled standard deviation of 0.35% across all contours, operators and FE levels conducted on the apparatus and with the method disclosed herein.

DETAILED DESCRIPTION

Before describing several exemplary embodiments of the disclosure, it is to be understood that the disclosure is not limited to the details of construction or process steps set forth in the following description. The disclosure is capable of other embodiments and of being practiced or being carried out in various ways.

Disclosed herein is a system to measure the filtration efficiency (FE) of particulate filters. In some embodiments, the system is cost-efficient, and/or essentially non-contaminating, and/or capable of being operated at high speed, so as to, for example, enable FE measurement of a large percentage, even up to 100%, of honeycomb filter bodies in manufacture. In contrast to a Laboratory FE bench apparatus (or "Lab FE System"), the system disclosed herein, which is sometimes referred to herein as the "Clean FE bench test system" or "Clean FE Test Apparatus" or "Clean FE System", may in some embodiments comprise alternate particle generation, and/or particle measurement and/or data analysis from the Lab FE System.

Figure 1:
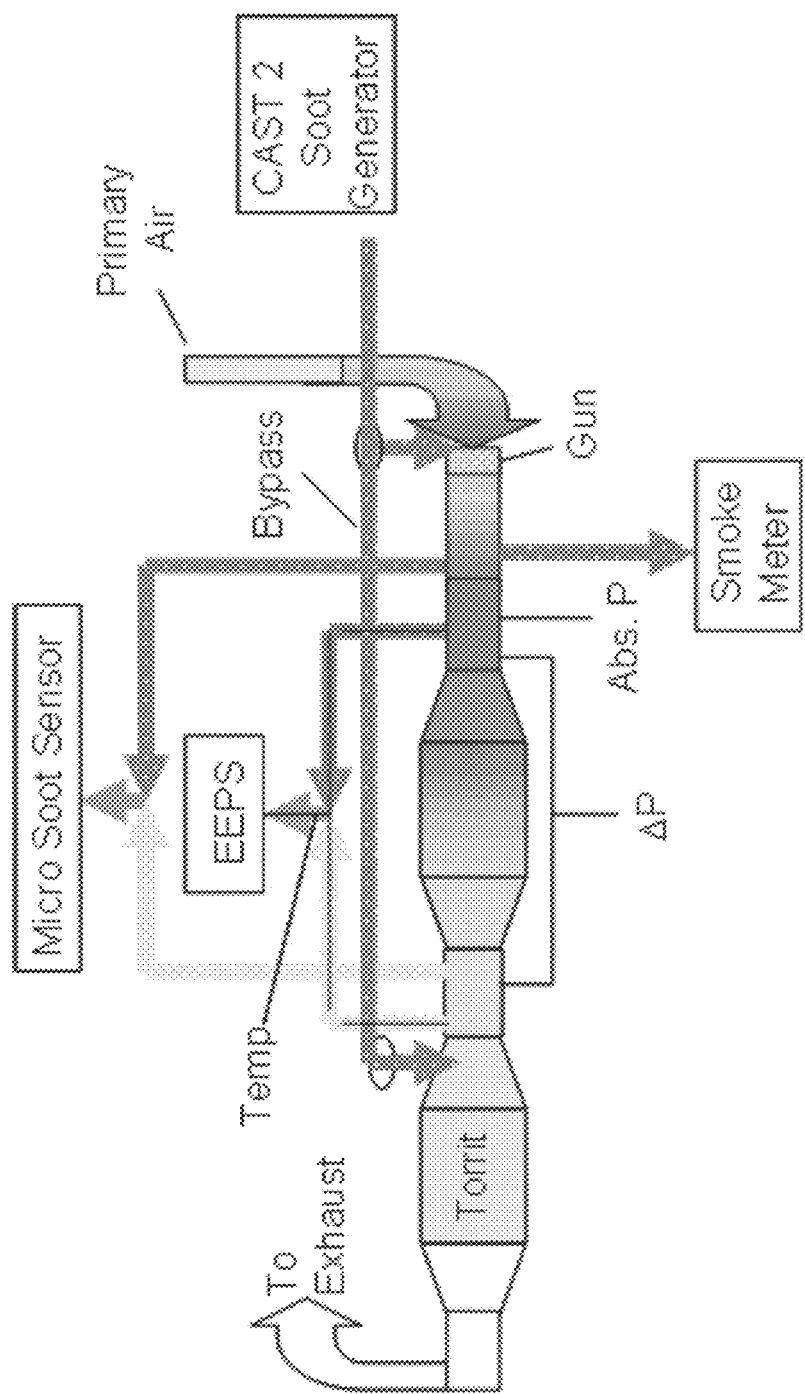
FIG. 1 is a schematic of a Lab FE system which can be used to measure filtration efficiency in a lab environment.

FIG. 1 is a schematic of a Lab FE system which can be used to measure filtration efficiency in a lab environment. Particles are generated by a CAST soot generator, and a desired amount of soot is mixed with an air stream (Primary Air) by a gun or nozzle (Gun) and passed through a duct toward the filter and collected (e.g. Torit dust collector) exhausted to an abatement system. Any remainder of unused soot generated can be directed to the dust collector by a bypass line (Bypass). Micro soot sensors are used to measure transient soot total concentration at low concentration levels with high sensitivity and excellent un-biased accuracy. Pressure drop (ΔP) across the filter being tested can be measured, as can absolute pressure (Abs. P) just upstream of the filter. Engine Exhaust Particle Sizer (EEPS) sensors are used to measure particle size distribution and total concentration in a real-time manner to monitor filtration efficiency ("FE") during the cycle of the test. Measurements of the particle concentration and particle size distribution are performed upstream and downstream of the honeycomb body. Filtration efficiency FE can be obtained from the measured concentrations and Equation 1:

$$\mu_e = n_t/n_u = (n_u - n_d)/n_u \quad (1)$$

where $\mu_e$=air filter efficiency, $n_t$=particles trapped, $n_u$=particles upstream, and $n_d$=particles downstream.

Figure 2B:
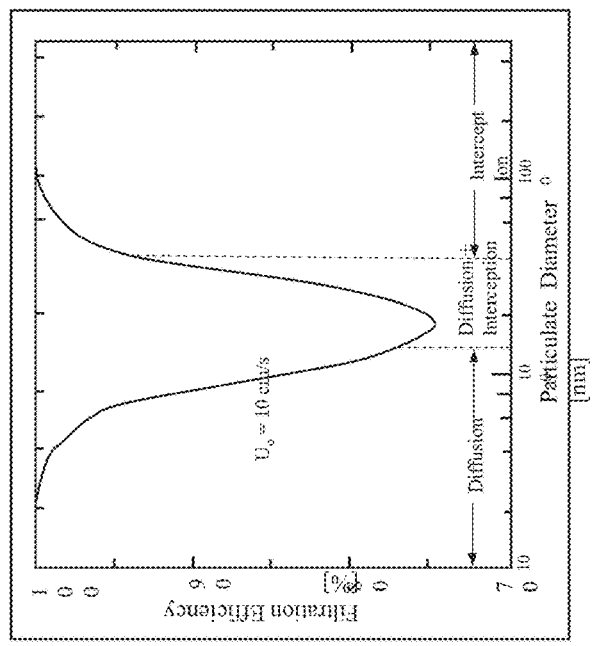
FIG. 2B schematically depicts filtration efficiency vs. particulate diameter and the associated theoretical particulate trapping mechanisms of FIG. 2A.
Figure 2A:
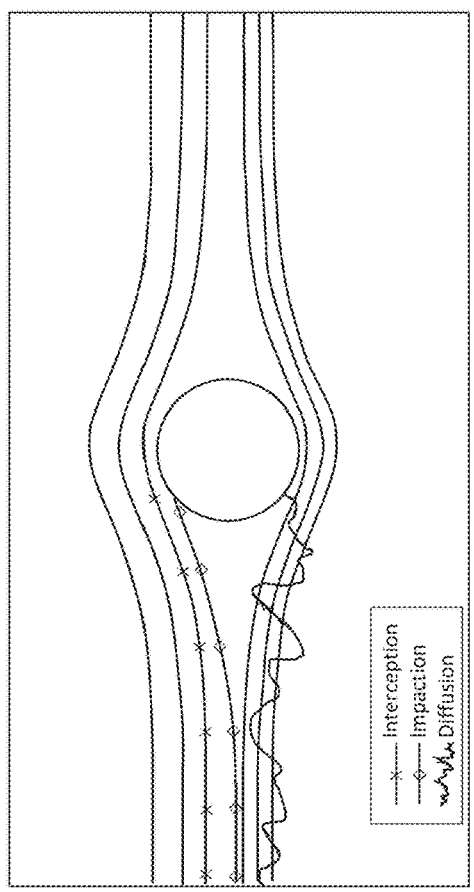
FIG. 2A shows three theoretical particulate trapping mechanisms which can combine to provide filtration efficiency: interception, impaction, and diffusion.

Without being limited by any particular theory of operation, as shown in FIGS. 2A and 2B, it is believed that, depending on the particle size, three particulate trapping mechanisms can combine to provide filtration efficiency: interception, impaction, and diffusion. For example, smaller particles can be trapped primarily by diffusion, larger particles can be trapped primarily by interception and impaction, and intermediate sized particles can be trapped by a combination of diffusion and interception. Thus, the initial filtration efficiency of a new or fresh ceramic honeycomb filter like a gasoline particulate filter (GPF) can vary for different particle sizes. For example, smaller and larger particles could be all trapped, but a lower filtration efficiency can be observed for particles of around 200 nm in diameter.

Figure 3:
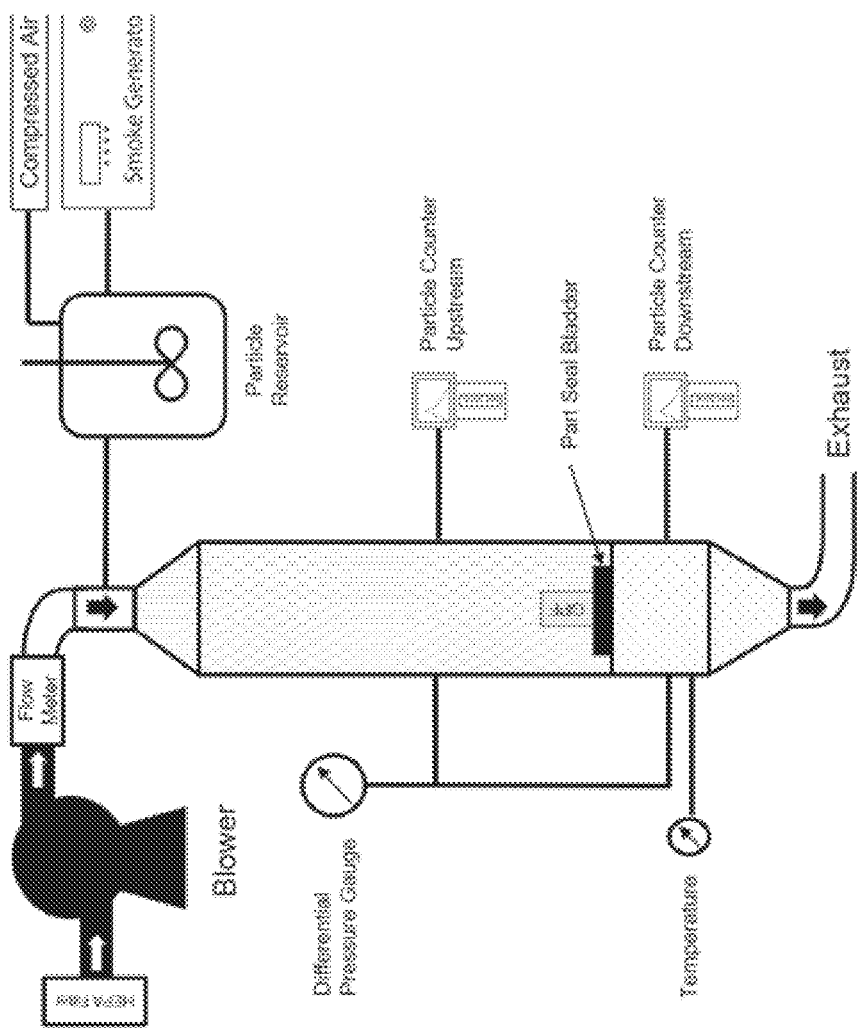
FIG. 3 schematically depicts an embodiment of the Clean FE system disclosed herein, shown with a GPF ceramic honeycomb filter body for testing.

FIG. 3 schematic depicts an embodiment of the Clean FE system disclosed herein, shown with a GPF ceramic honeycomb filter body for testing. The GPF part is shown loaded into a tight bladder seal that is embedded in a section of a round duct connected to a blower. The blower pushes conditioned air (or one or more other gases) through the duct at a set flow rate toward the GPF. After the flow becomes stable, a small amount of smoke from a reservoir is pushed into the duct using compressed air (or one or more other gases). The smoke particles mix into the flow stream and are passed through the GPF which filters out a percentage of these particles which is indicative of the filtration efficiency of the GPF. Diffraction based optical particle counters are placed upstream and downstream of the GPF to count the number of smoke particles entering and exiting the GPF. The filtration efficiency of the GPF is calculated using Equation 1. The flow rate through the GPF is maintained at a constant rate using the blower and a temperature-compensated flow meter.

Figure 4A:
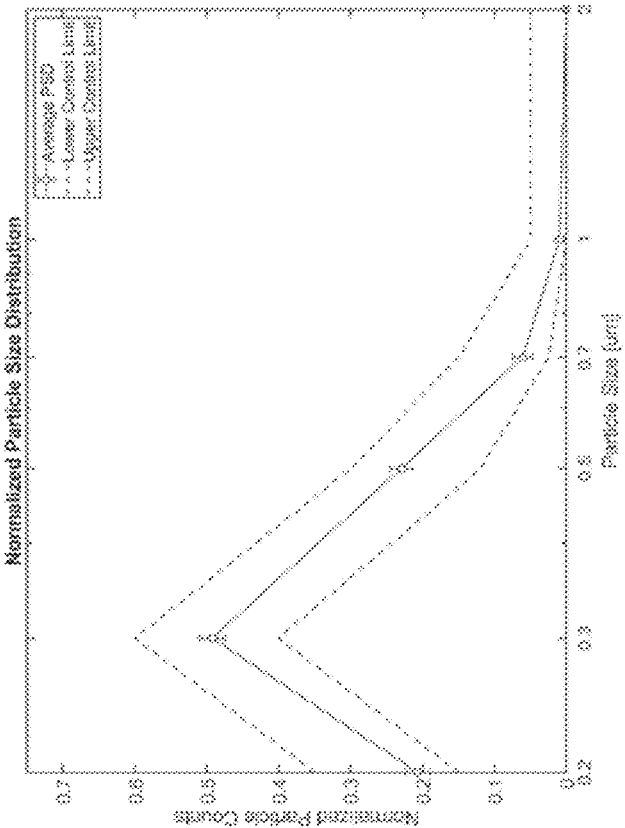
FIG. 4A shows a plot of a representative a representative particle size distribution of the particles used to measure the filtration efficiency of a GPF filter in the Clean FE system.
Figure 4B:
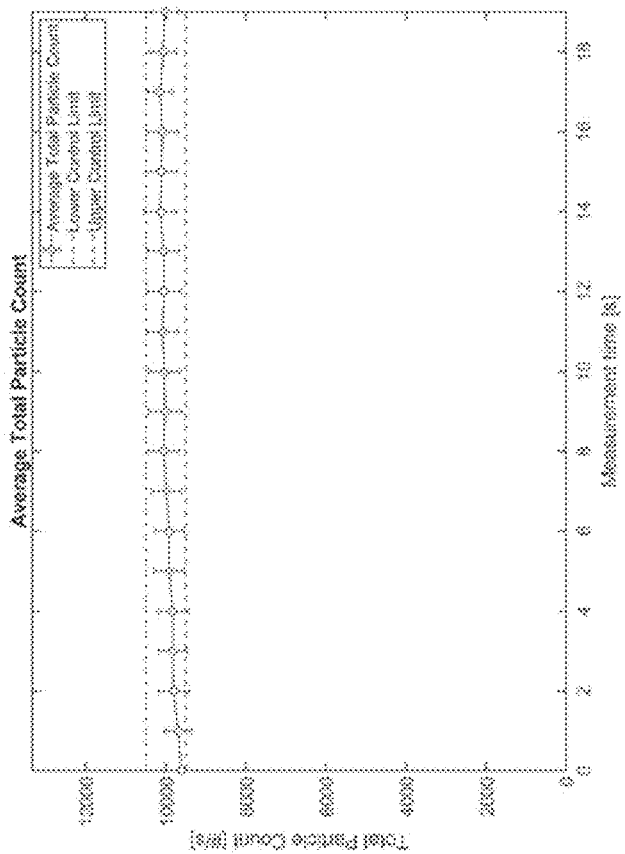
FIG. 4B shows an exemplary preferred target upstream particle concentration and concentration range for permitting the FE measurement to proceed.

The reservoir can contain particulates from a variety of sources, such as (burning) cigarettes, liquid atomizer, burnt organic powders, and the like. In some embodiments, for filters such as gasoline particulate filters, the particulates coming from the reservoir preferably have a particle size distribution in a range from 0.2 µm to 2.0 µm, more preferably with a peak at 0.3 µm. FIG. 4A shows a plot of a representative particle size distribution of the particles used to measure the filtration efficiency of a GPF filter in the Clean FE system. The range of particles runs from 0.2 µm to 2.0 µm with a peak at 0.3 µm. In addition to the particle size distribution, the particle concentration of the supplied particles is preferably optimized to maximize the signal to noise ratio of the particle counters without overloading the particle counters. FIG. 4B shows an exemplary preferred target upstream particle concentration and concentration range for permitting the FE measurement to proceed. In preferred embodiments, the target upstream particle count is between 9000 and 11000, and in other preferred embodiments between 9500 and 10500. Particle counters can operate accurately at relatively low concentrations compared to the equipment used on the Lab FE bench (EEPS, CPC, etc.) and therefore particle counters are preferred. Particle counters are further preferred, and could be very important in various embodiments, for obtaining stable, consistent, and/or repeatable FE results during the measurement of the GPF, and even after many repeated tests. Moreover, optical based particle counters are much cheaper (in some cases orders of magnitude) than other measurement methods.

In various embodiments disclosed herein, a system and method are provided for the measurement of Filtration Efficiency (FE) of a particulate filter. FE is determined by measuring the difference between a number of particles that are introduced into the particulate filter and a number of particles that exit the particulate filter at a defined air flow condition.

FIG. 3 is illustrative of a set of embodiments disclosed herein. FIG. 3 illustrates a system that performs the FE measurement which comprises three main components: (1) a flow delivery system with particulate filter holder; (2) a particle generator with metering capability and a particle delivery system; (3) a set of aerosol spectrometers to measure particle count and size distribution.

To generate test conditions for a stable, repeatable and accurate FE measurement preferably there is control of each of these three components in the system.

In this set of embodiments, the flow delivery system comprises a sealed round duct, but not limited to round such as if accommodating oval contours, with a centrifugal blower pulling air from the room through a HEPA filter (99.97% FE for particles >0.3 um) to eliminate contaminants from the room. The air leaves the blower and is forced into a duct which contains the particulate filter holder. The duct is sufficiently sized to accommodate the largest size particulate filter to be tested plus some room for the particulate filter holder. The holder is a plate with a hole and a pneumatic bladder that have inner diameters slightly larger than the part. To load the particulate filter into the holder an encased rubber ring is deflated, and the part is loaded into the holder plate and rests on retaining pins. The rubber ring is then inflated to seal against the outer diameter of the particulate filter and center the particulate filter in the holder. The upper section of duct test section is then lowered to meet the lower section of duct below the filter and a tight seal is formed such as by using a gasket.

After the part has been loaded and sealed in the test section the blower flow rate is increased, or ramped up, to the target flow rate. Preferably the flow rate through the test chamber is stable and controlled over the range of temperatures of the gas flowing through the system. In one embodiment, a Sierra Quadra-Therm 780i mass flow meter with temperature correction was used to control the blower speed to the correct flow rate of 51 Nm^3/hr.+/−0.1 Nm^3/hr. independent of the gas temperature. The gas temperature is preferably monitored and controlled. In some embodiments, the temperature was not actively controlled but the measurement did not commence (did not pass) until the temperature was between 18-40 deg C.

The next step in the process is to inject the particles of proper size (as discussed herein) into the flow stream upstream of the particulate filter at the proper concentrations. Preferably a minimum distance (such as about 5 tube diameters) separates the injection point and the first measurement point to allow for proper mixing of the particles into the flow stream; having such separation distance or spacing can avoid otherwise unintended variations in concentrations or concentration fluctuations, which could lead to false measurement. In one embodiment, the particles were generated from burning cigarettes which generated cigarette smoke having a median particle size of 300 nm and particle size distribution as shown in FIG. 4B. The particles could also be generated from or by other sources, like liquid nebulizers or the burning of organic powders. In the one embodiment, the particles used in the system were generated by burning cigarettes and puffing smoke into a reservoir using a smoke respirator. The smoke respirator pulls air through the lit cigarette with puff period equal to 10 using a square wave puff pattern. The particles flow into the reservoir where a stirring fan keeps the particles airborne until they are pushed into the main chamber flow stream using a compressed air source and mass flow controller. An upper limit on the mass flow controller helped to ensure that the overall flow rate was constant. When that limit was reached, a new puff from the cigarette was required. The particles mixed into the air flow stream in the main test section ahead of the particulate filter under test. The mass flow controller was used to adjust the amount of smoke that was pushed into the test section such that the total amount of particles in the test chamber was 10,000 particles/sec+/−500 particles/sec. The particle concentration and size distribution were measured using an upstream airborne particle counter (Lighthouse Worldwide Solutions model Handheld 2016). In addition to the total particle concentration, concentration variability and concentration stability, the particle size distribution was also controlled (selected). In this embodiment of the Clean FE system (here a Smoke FE system) the particle count in each of the particle size bins was set to be within 10% of its defined setpoint, between 0.2 μm and 2 μm (see FIG. 4B).

The Smoke FE blower and smoke delivery systems were run until the smoke concentration and particle size distribution reached stable values within an acceptable range. The system then recorded 20 seconds of data from the upstream and downstream particle counters. The system then calculated a 20 second average using only the 0.3 μm bin size particles to produce upstream and downstream particle counts that were entered into Equation 1, and it was determined experimentally that using the total particle counts across all particle sizes (or some small band of particle sizes) produced a higher variability in the FE measurement. This variability is believed to be because the particulate filter efficiency is sensitive to the size of the source particles generated during the puff. To eliminate this impact only the 20 second average particle count from the 0.3 μm smoke particle size (0.3 μm bin) was used for the filtration efficiency calculation. In addition to the 20 second average, RMS and slope were determined. The RMS can be used to clarify or identify measurements where the particle concentration is particularly noisy, such as often seen after a fresh puff. The slope is determined to ensure that the particle concentration is constant (or substantially constant) during the 20 second measurement.

Pressure difference due to flow through the filter part can also be measured by the system, in some embodiments after the FE determination is complete. In one embodiment, three ports were provided to measure the pressure before (upstream) and after (downstream) the part. The measured pressures were physically averaged and a differential pressure gauge recorded the data. The system can be configured to shut off the blower after the pressure measurements are complete; the test chamber can then be opened, the part-holding bladder can be deflated and the particulate filter can be removed. The next filter can then be loaded and the process repeated. In some embodiments, the Clean FE system can be configured to process parts at a rate of one per about 1 minute 40 seconds per part from load to unload. In some embodiments, total measurement time could be further decreased for example by leaving the blower running (not turning off the blower) between measurements, and/or by replacing the smoke generator with a fully automated system, e.g. liquid aerosol generator, which would eliminate lighting or burning of organic matter such as cigarettes.

Figure 5:
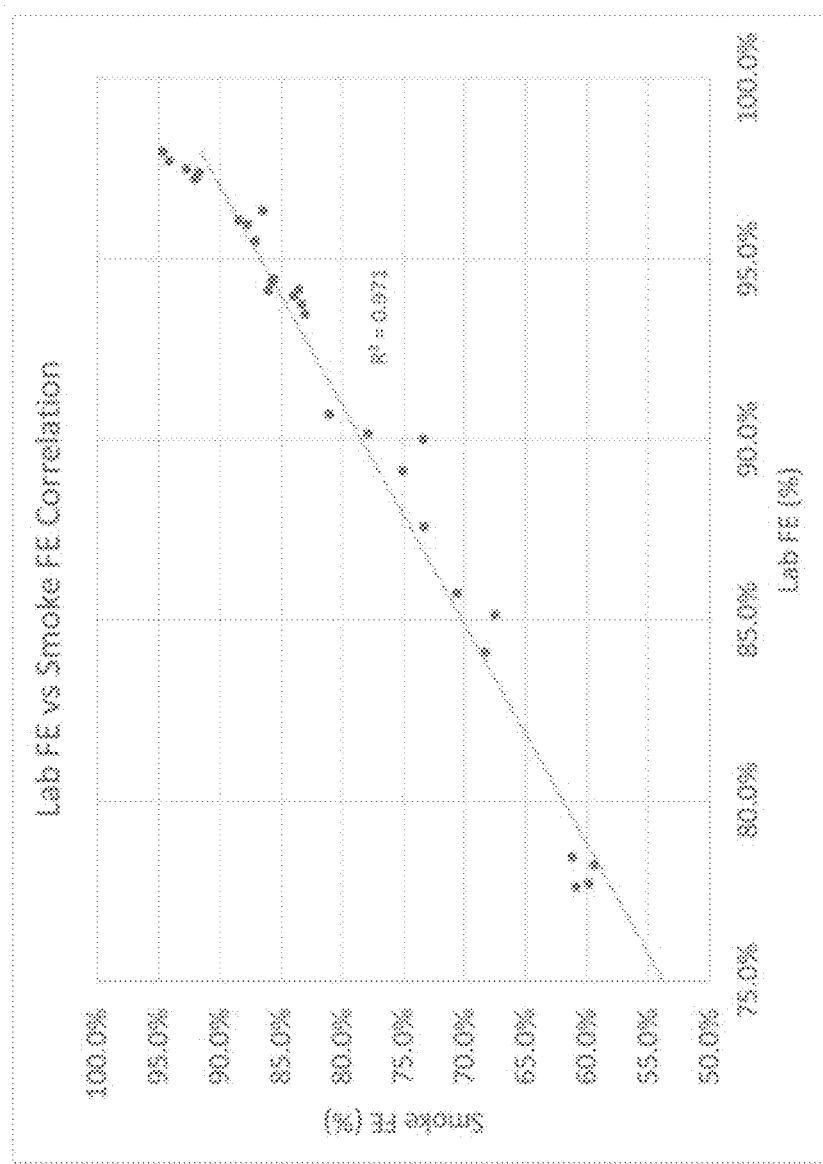
FIG. 5 shows a correlation between Smoke FE measurements and Lab FE measurements.
Figure 6B:
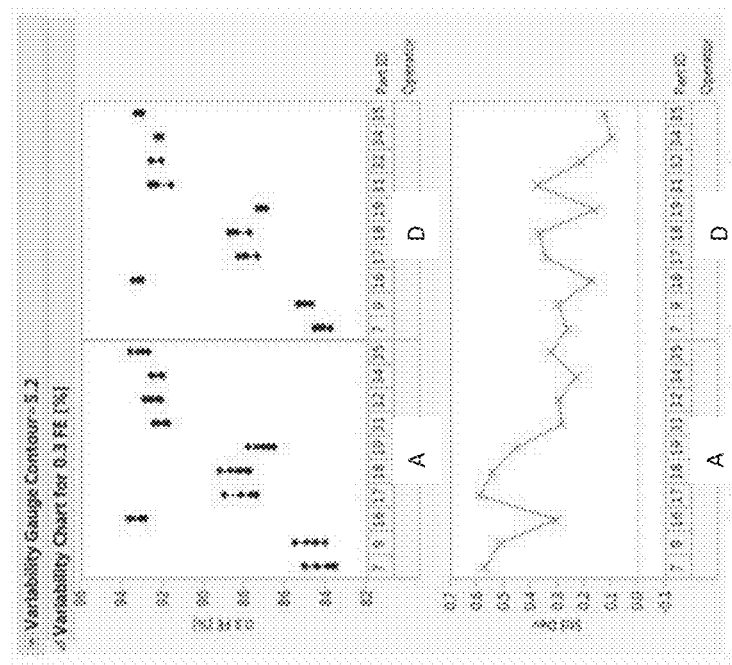
FIG. 6B shows Measurement System Analysis (MSA) results for the Clean FE system with smoke (Smoke FE system) showing the raw data for 5.2 inch diameter contour part with 10 parts at various FE levels for each contour measured 3 times each by 2 operators.
Figure 6A:
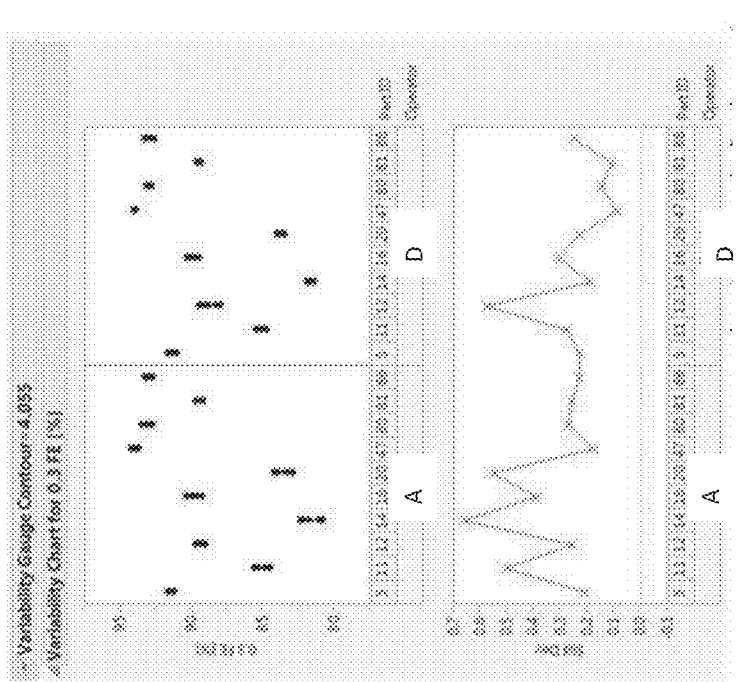
FIG. 6A shows Measurement System Analysis (MSA) results for the Clean FE system with smoke (Smoke FE system) showing the raw data for 4.055 inch diameter contour part with 10 parts at various FE levels for each contour measured 3 times each by 2 operators.

In order to test the capability of the Clean FE system, a Measurement Systems Analysis (MSA) with bias and linearity study was performed to assess variability along with correlation study with the Lab FE system. The MSA to test measurement repeatability consisted of 10 round particulate filters each 2 part diameters measured 3 times each by 2 operators. The filters were all comprised of porous cordierite Corning GC 1.0 gasoline particulate filter material composition and were 300 cells per square inch (CPSI) and 0.008" (8 mil) wall thickness per channel walls. FIG. 6A shows Measurement System Analysis (MSA) results for the Clean FE system with smoke (Smoke FE system) showing the raw data for 4.055 inch diameter contour part with 10 parts at various FE levels for each contour measured 3 times each by 2 operators; FIG. 6B shows Measurement System Analysis (MSA) results for the Clean FE system with smoke (Smoke FE system) showing the raw data for 5.2 inch diameter contour part with 10 parts at various FE levels for each contour measured 3 times each by 2 operators. Thus, there were 10 parts at various FE levels for each contour measured 3 times each by 2 operators. As seen in FIGS. 6A and 6B, the raw data indicated a tight distribution of FE measurement across operators, part diameters and FE level. The analysis results in FIG. 7 show a low pooled standard deviation of 0.35% across all contours, operators and FE levels. For purposes of evaluating these parts, the MSA results were within acceptable levels when averaged across all part contours operators and FE levels. The GRR, or Gage R&R, or Gauge Repeatability and Reproducibility, is a methodology used to assess the amount of variation in measurement data to the measure system as part of the MSA. A comparison was made between the Clean FE system using smoke particles ('Smoke FE system') to a standard Laboratory FE system by performing a bias and linearity study, with results shown in FIG. 5: the correlation coefficient between the Smoke and Lab FE systems was 0.97 indicating a strong correlation. An offset was observed between the systems which is believed to be due to the size of particles and the filtration sensitivity of the particulate filter to particles of different size, as set forth in FIG. 2, as the Laboratory FE soot particle mean diameter was about 75 nm whereas the Smoke FE particle size was about 300 nm. If desired, the offset between the Laboratory FE and Smoke FE systems can be accounted for with a correction factor. Also, the Lab FE bench operates at a lower flow rate and uses different particle measurement systems. Other data also shows a correlation between the Smoke FE system and Combustion, a commercial FE measurement system utilizing soot particles. One advantage of the Smoke FE system disclosed herein is that due to being able to particle size, the measured FE can be lower and scales better; therefore a much higher resolution can be obtained and small differences in FE can be identified.

Figure 8B:
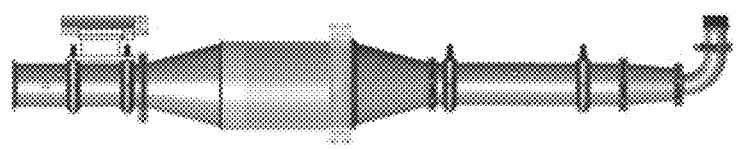
FIG. 8B schematically illustrates a clean FE apparatus which utilizes a bladder system.
Figure 8A:
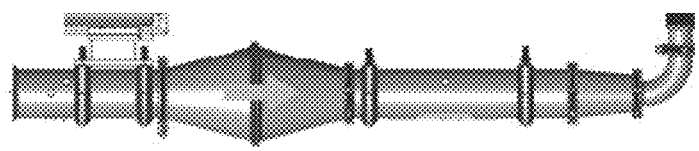
FIG. 8A schematically illustrates a clean FE apparatus which does not have a bladder system installed, but instead uses a conical section where the filter parts are seated and sealed against a soft rubber liner.

FIG. 8A schematically illustrates a clean FE apparatus which does not have a bladder system installed, but instead uses a conical section where the filter parts are seated and sealed against a soft rubber liner.

FIG. 8B schematically illustrates a clean FE apparatus which utilizes a bladder system.

In one set of embodiments, a method is disclosed herein of determining a filtration efficiency of a filter comprised of a porous wall portion, the filter having a longitudinal axis extending from an inlet end to an outlet end, and an outer peripheral portion extending parallel to the longitudinal axis and surrounding the porous wall portion, the method comprising: sealing the outer peripheral portion to prevent gas flow across an outermost surface of the outer peripheral portion; forcing an inlet flow comprised of a gas (air) flow into the inlet end of the filter at a set flow rate; introducing particles into the inlet flow; and optically counting the number of particles entering and exiting the filter during a sampling event. In some embodiments, the particles are smoke particles. In some embodiments, optically counting the number of particles entering and exiting the filter during a sampling event is accomplished with diffraction based optical particle counters positioned upstream and downstream of the filter.

In some embodiments the particles are selected to have a particle size distribution which maximizes the signal to noise ratio of the particle counters.

In some embodiments the particles are selected to have a particle size distribution which maximizes the signal to noise ratio of the particle counters without overloading the particle counters.

In some embodiments the particles are generated by burning cigarettes to create cigarette smoke particles. In some embodiments the cigarette smoke particles are put into a reservoir. In some embodiments the cigarette smoke particles are put into a reservoir using a smoke respirator.

In some embodiments the sampling event lasts until over 5000 particles are counted upstream of the filter. In some embodiments the sampling event lasts until over 8000 particles are counted upstream of the filter. In some embodiments the sampling event lasts until 9000 or more particles are counted upstream of the filter. In some embodiments the sampling event lasts until 15000 particles are counted upstream of the filter. In some embodiments the sampling event lasts until 12000 particles are counted upstream of the filter. In some embodiments the sampling event lasts until between 9000 and 11000 particles are counted upstream of the filter. In some embodiments the sampling event lasts until between 9500 and 10050 particles are counted upstream of the filter.

In some embodiments the sampling event lasts for 10 to 30 seconds. In some embodiments the sampling event lasts for 15 to 25 seconds. In some embodiments the sampling event lasts for 20 seconds.

In some embodiments the particles introduced into the inlet flow have a particle size distribution in a range from 0.2 μm to 2.0 μm with a median particle size of 0.3 μm. In some embodiments the particles introduced into the inlet flow have a particle size distribution in a range from 0.2 μm to 2.0 μm, with a peak between 0.2 and 0.4 μm. wherein the particles introduced into the inlet flow have a particle size distribution in a range from 0.2 μm to 2.0 μm, with a peak at 0.3 μm. In some embodiments the particles are present upstream of the filter at a particle concentration of target upstream particle count is between 9000 and 11000, and in other preferred embodiments between 9500 and 10500.

In some embodiments the gas flow is maintained at a volumetric flow rate which does not vary by more than 10% during the sampling event. In some embodiments the volumetric flow rate of the gas flow is maintained with a temperature-compensated flow meter. In some embodiments the gas flow is maintained at greater than 35 Nm^3/hr and less than 60 Nm^3/hr. In some embodiments the gas flow is maintained at 51 Nm^3/hr.+/−0.1 Nm^3/hr. independent of the gas temperature.

In some embodiments the gas flow is between 15 and 50 deg C. In some embodiments the gas flow is between 18 and 40 deg C. In some embodiments the gas flow is temperature controlled. In some embodiments the gas flow is between 15 and 50 deg C.

In some embodiments the particles are selected from the group consisting of cigarette smoke particles, atomized particles, liquid particles, nebulized particles, burnt organic powder, and combinations thereof.

In some embodiments the inlet flow of the gas is filtered to remove contaminants; in some of these embodiments the inlet flow of the gas is filtered through a HEPA filter to remove contaminants; in some of these embodiments the inlet flow of the gas is filtered through a HEPA filter with 99.97% FE for particles of greater than 0.3 μm to remove contaminants.

In some embodiments the particles are introduced farther upstream than the location where upstream optical particle counting occurs. In some embodiments the inlet flow of the gas is directed through a hollow tube having an effective diameter Deff, and the particles are introduced at a distance of 5Deff upstream of where upstream particle counting occurs.

In some embodiments the filtration efficiency of the filter is determined from the equation:

$$\mu_e = (n_u - n_d)/n_u \quad (1),$$

where $\mu_e$=filter efficiency, $n_u$=particles upstream, and $n_d$=particles downstream.

In some embodiments the filtration efficiency of the filter is determined from the equation:

$$\mu_e = (n_u - n_d)/n_u \quad (1),$$

where $\mu_e$=filter efficiency, $n_u$=particles upstream in the 0.3 μm sampling bin, and $n_d$=particles downstream in the 0.3 μm sampling bin.

In some embodiments the porous wall portion comprises walls having bulk porosity of 40 to 75% as measured by mercury porosimetry.

In some embodiments the porous wall portion comprises walls comprised of cordierite, aluminum titanate, silicon carbide, mullite, spinel, silica, alumina, silicon nitride, and combinations thereof.

In some embodiments the porous wall portion comprises walls arranged in a honeycomb structure of 100 to 900 cells per square inch.

In some embodiments the filter has a soot loading of less than 0.1 grams/cubic inch of filter volume, both before, and immediately at the end of, the sampling event.

In some embodiments the filter has an ash loading of less than 0.1 grams/cubic inch of filter volume, both before, and immediately at the end of, the sampling event.

Figure 9:
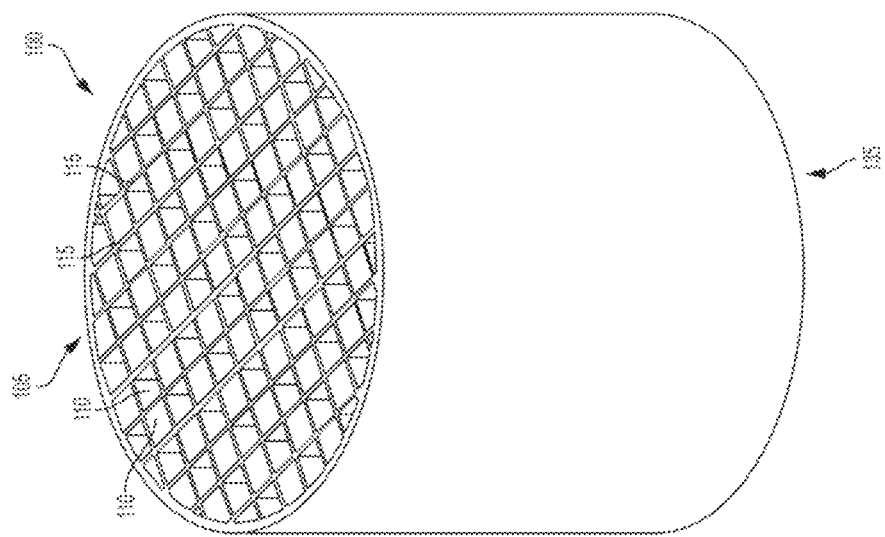
FIG. 9 schematically depicts a honeycomb body.

With reference now to FIG. 9, a honeycomb body 100 according to one or more embodiments shown and described herein is depicted. The honeycomb body 100 may, in embodiments, comprise a plurality of walls 115 defining a plurality of inner channels 110. The plurality of inner channels 110 and intersecting channel walls 115 extend between first end 105, which may be an inlet end, and second end 135, which may be an outlet end, of the plugged honeycomb body. The honeycomb body may have one or more of the channels plugged on one, or both of the first end 105 and the second end 135. The pattern of plugged channels of the honeycomb body is not limited. In some embodiments, a pattern of plugged and unplugged channels at one end of the plugged honeycomb body may be, for example, a checkerboard pattern where alternating channels of one end of the plugged honeycomb body are plugged. In some embodiments, plugged channels at one end of the plugged honeycomb body have corresponding unplugged channels at the other end, and unplugged channels at one end of the plugged honeycomb body have corresponding plugged channels at the other end.

In one or more embodiments, the plugged honeycomb body may be comprised of cordierite, aluminum titanate, enstatite, mullite, forsterite, corundum (SiC), spinel, sapphirine, or periclase, or combinations thereof. In general, cordierite has a composition according to the formula $Mg_2Al_4Si_5O_{18}$. In some embodiments, the pore size of the ceramic material, the porosity of the ceramic material, and the pore size distribution of the ceramic material are obtained in a controlled manner, for example by varying the particle sizes of the ceramic raw materials. In addition, pore formers can be included in ceramic batches used to form the plugged honeycomb body.

In some embodiments, walls of the plugged honeycomb body may have an average thickness from greater than or equal to 25 μm to less than or equal to 250 μm, such as from greater than or equal to 45 μm to less than or equal to 230 μm, greater than or equal to 65 μm to less than or equal to 210 μm, greater than or equal to 65 μm to less than or equal to 190 μm, or greater than or equal to 85 μm to less than or equal to 170 μm. The walls of the plugged honeycomb body can be described to have a base portion comprised of a bulk portion (also referred to herein as the bulk), and surface portions (also referred to herein as the surface). The surface portion of the walls extends from a surface of a wall of the plugged honeycomb body into the wall toward the bulk portion of the plugged honeycomb body. The surface portion may extend from 0 (zero) to a depth of about 10 μm into the base portion of the wall of the plugged honeycomb body. In some embodiments, the surface portion may extend about 5 μm, about 7 μm, or about 9 μm (i.e., a depth of 0 (zero)) into the base portion of the wall. The bulk portion of the plugged honeycomb body constitutes the thickness of wall minus the surface portions. Thus, the bulk portion of the plugged honeycomb body may be determined by the following equation:

$$t_{total} - 2t_{surface}$$

where $t_{total}$ is the total thickness of the wall and $t_{surface}$ is the thickness of the wall surface.

In one or more embodiments, the bulk of the plugged honeycomb body (prior to applying any filtration material) has a bulk median pore size from greater than or equal to 7 μm to less than or equal to 25 μm, such as from greater than or equal to 12 μm to less than or equal to 22 μm, or from greater than or equal to 12 μm to less than or equal to 18 μm. For example, in some embodiments, the bulk of the plugged honeycomb body may have bulk median pore sizes of about 10 μm, about 11 μm, about 12 μm, about 13 μm, about 14 μm, about 15 μm, about 16 μm, about 17 μm, about 18 μm, about 19 μm, or about 20 μm. Generally, pore sizes of any given material exist in a statistical distribution. Thus, the term "median pore size" or "d50" (prior to applying any filtration material) refers to a length measurement, above which the pore sizes of 50% of the pores lie and below which the pore sizes of the remaining 50% of the pores lie, based on the statistical distribution of all the pores. Pores in ceramic bodies can be manufactured by at least one of: (1) inorganic batch material particle size and size distributions; (2) furnace/heat treatment firing time and temperature schedules; (3) furnace atmosphere (e.g., low or high oxygen and/or water content), as well as; (4) pore formers, such as, for example, polymers and polymer particles, starches, wood flour, hollow inorganic particles and/or graphite/carbon particles.

In specific embodiments, the median pore size (d50) of the bulk of the plugged honeycomb body (prior to applying any filtration material) is in a range of from 10 μm to about 16 μm, for example 13-14 μm, and the d10 refers to a length measurement, above which the pore sizes of 90% of the pores lie and below which the pore sizes of the remaining 10% of the pores lie, based on the statistical distribution of all the pores is about 7 μm. In specific embodiments, the d90 refers to a length measurement, above which the pore sizes of 10% of the pores of the bulk of the plugged honeycomb body (prior to applying any filtration material) lie and below which the pore sizes of the remaining 90% of the pores lie, based on the statistical distribution of all the pores is about 30 μm. In specific embodiments, the median diameter (D50) of the secondary particles or agglomerates is about 2 microns. In specific embodiments, it has been determined that when the agglomerate median size D50 and the median wall pore size of the bulk honeycomb body d50 is such that there is a ratio of agglomerate median size D50 to median wall pore size of the bulk honeycomb body d50 is in a range of from 5:1 to 16:1, excellent filtration efficiency results and low pressure drop results are achieved. In more specific embodiments, a ratio of agglomerate median size D50 to median wall pore size of the bulk of honeycomb body d50 (prior to applying any filtration material) is in a range of from 6:1 to 16:1, 7:1 to 16:1, 8:1 to 16:1, 9:1 to 16:1, 10:1 to 16:1, 11:1 to 16:1 or 12:1 to 6:1 provide excellent filtration efficiency results and low pressure drop results.

In some embodiments, the bulk of the plugged honeycomb body may have bulk porosities, not counting a coating, of from greater than or equal to 50% to less than or equal to 75% as measured by mercury intrusion porosimetry. Other methods for measuring porosity include scanning electron microscopy (SEM) and X-ray tomography, these two methods in particular are valuable for measuring surface porosity and bulk porosity independent from one another. In one or more embodiments, the bulk porosity of the plugged honeycomb body may be in a range of from about 50% to about 75%, in a range of from about 50% to about 70%, in a range of from about 50% to about 65%, in a range of from about 50% to about 60%, in a range of from about 50% to about 58%, in a range of from about 50% to about 56%, or in a range of from about 50% to about 54%, for example.

In one or more embodiments, the surface portion of the plugged honeycomb body has a surface median pore size from greater than or equal to 7 µm to less than or equal to 20 µm, such as from greater than or equal to 8 µm to less than or equal to 15 µm, or from greater than or equal to 10 µm to less than or equal to 14 µm. For example, in some embodiments, the surface of the plugged honeycomb body may have surface median pore sizes of about 8 µm, about 9 µm, about 10 µm, about 11 µm, about 12 µm, about 13 µm, about 14 µm, or about 15 µm.

In some embodiments, the surface of the plugged honeycomb body may have surface porosities, prior to application of a filtration material deposit, of from greater than or equal to 35% to less than or equal to 75% as measured by mercury intrusion porosimetry, SEM, or X-ray tomography. In one or more embodiments, the surface porosity of the plugged honeycomb body may be less than 65%, such as less than 60%, less than 55%, less than 50%, less than 48%, less than 46%, less than 44%, less than 42%, less than 40%, less than 48%, or less than 36% for example.

Figure 10:
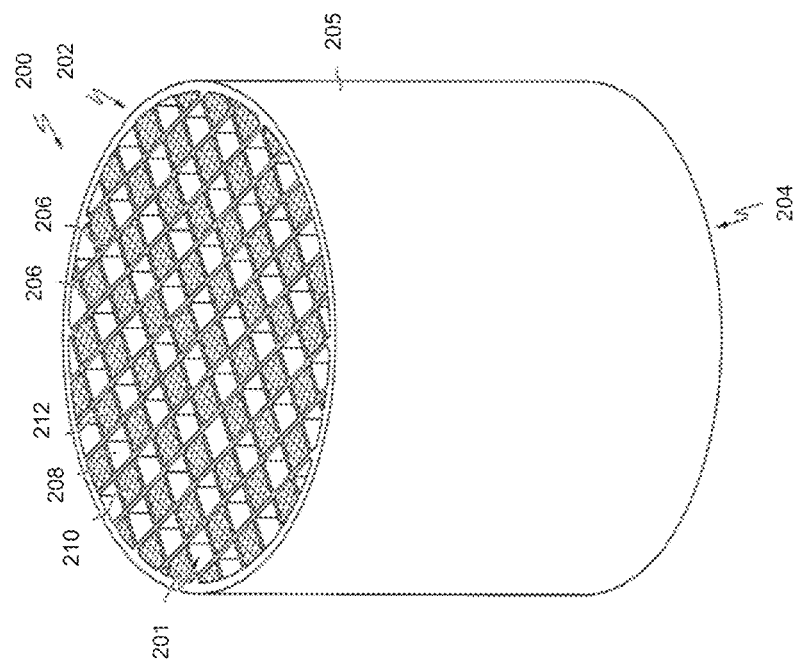
FIG. 10 schematically depicts a wall-flow particulate filter according to embodiments disclosed and described herein.
Figure 11:
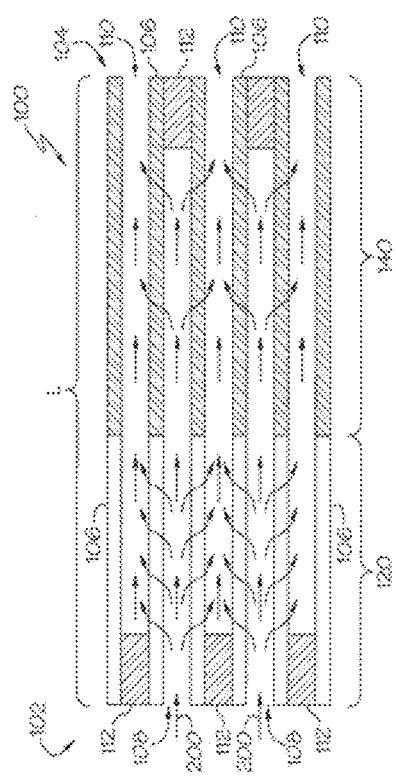
FIG. 11 is a cross-sectional longitudinal view of the particulate filter shown in FIG. 8.

Referring now to FIGS. 10 and 11, a honeycomb body in the form of a particulate filter 200 is schematically depicted. The particulate filter 200 may be used as a wall-flow filter to filter particulate matter from an exhaust gas stream 250, such as an exhaust gas stream emitted from a gasoline engine, in which case the particulate filter 200 is a gasoline particulate filter. The particulate filter 200 generally comprises a honeycomb body having a plurality of channels 201 or cells which extend between an inlet end 202 and an outlet end 204, defining an overall length La (shown in FIG. 11). The channels 201 of the particulate filter 200 are formed by, and at least partially defined by a plurality of intersecting channel walls 206 that extend from the inlet end 202 to the outlet end 204. The particulate filter 200 may also include a skin layer 205 surrounding the plurality of channels 201. This skin layer 205 may be extruded during the formation of the channel walls 206 or formed in later processing as an after-applied skin layer, such as by applying a skinning cement to the outer peripheral portion of the channels.

An axial cross section of the particulate filter 200 of FIG. 10 is shown in FIG. 11. In some embodiments, certain channels are designated as inlet channels 208 and certain other channels are designated as outlet channels 210. In some embodiments of the particulate filter 200, at least a first set of channels may be plugged with plugs 212. Generally, the plugs 212 are arranged proximate the ends (i.e., the inlet end or the outlet end) of the channels 201. The plugs are generally arranged in a pre-defined pattern, such as in the checkerboard pattern shown in FIG. 10, with every other channel being plugged at an end. The inlet channels 208 may be plugged at or near the outlet end 204, and the outlet channels 210 may be plugged at or near the inlet end 202 on channels not corresponding to the inlet channels, as depicted in FIG. 10. Accordingly, each cell may be plugged at or near one end of the particulate filter only.

While FIG. 10 generally depicts a checkerboard plugging pattern, it should be understood that alternative plugging patterns may be used in the porous ceramic honeycomb article. In the embodiments described herein, the particulate filter 200 may be formed with a channel density of up to about 600 channels per square inch (cpsi). For example, in some embodiments, the particulate filter 100 may have a channel density in a range from about 100 cpsi to about 600 cpsi. In some other embodiments, the particulate filter 100 may have a channel density in a range from about 100 cpsi to about 400 cpsi or even from about 200 cpsi to about 300 cpsi.

In the embodiments described herein, the channel walls 206 of the particulate filter 200 may have a thickness of greater than about 4 mils (101.6 microns). For example, in some embodiments, the thickness of the channel walls 206 may be in a range from about 4 mils up to about 30 mils (762 microns). In some other embodiments, the thickness of the channel walls 206 may be in a range from about 7 mils (177.8 microns) to about 20 mils (508 microns).

In some embodiments of the particulate filter 200 described herein the channel walls 206 of the particulate filter 200 may have a bare open porosity (i.e., the porosity before any coating is applied to the plugged honeycomb body) % P≥35% prior to the application of any coating to the particulate filter 200. In some embodiments the bare open porosity of the channel walls 206 may be such that 40%≤% P≤75%. In other embodiments, the bare open porosity of the channel walls 206 may be such that 45%≤% P≤75%, 50%≤% P≤75%, 55%≤% P≤75%, 60%≤% P≤75%, 45%≤% P≤70%, 50%≤% P≤70%, 55%≤% P≤70%, or 60%≤% P≤70%.

Further, in some embodiments, the channel walls 206 of the particulate filter 200 are formed such that the pore distribution in the channel walls 206 has a median pore size of ≤30 microns prior to the application of any coatings (i.e., bare). For example, in some embodiments, the median pore size may be ≥8 microns and less than or ≤30 microns. In other embodiments, the median pore size may be ≥10 microns and less than or ≤30 microns. In other embodiments, the median pore size may be ≥10 microns and less than or ≤25 microns. In some embodiments, particulate filters produced with a median pore size greater than about 30 microns have reduced filtration efficiency while with particulate filters produced with a median pore size less than about 8 microns may be difficult to infiltrate the pores with a washcoat containing a catalyst. Accordingly, in some embodiments, it is desirable to maintain the median pore size of the channel wall in a range of from about 8 microns to about 30 microns, for example, in a range of rom 10 microns to about 20 microns.

In one or more embodiments described herein, the plugged honeycomb body of the particulate filter 200 is formed from a metal or ceramic material such as, for example, cordierite, silicon carbide, aluminum oxide, aluminum titanate or any other ceramic material suitable for use in elevated temperature particulate filtration applications. For example, the particulate filter 200 may be formed from cordierite by mixing a batch of ceramic precursor materials which may include constituent materials suitable for producing a ceramic article which predominately comprises a cordierite crystalline phase. In general, the constituent materials suitable for cordierite formation include a combination of inorganic components including talc, a silica-forming source, and an alumina-forming source. The batch composition may additionally comprise clay, such as, for example, kaolin clay. The cordierite precursor batch composition may also contain organic components, such as organic pore formers, which are added to the batch mixture to achieve the desired pore size distribution. For example, the batch composition may comprise a starch which is suitable for use as a pore former and/or other processing aids. Alternatively, the constituent materials may comprise one or more cordierite powders suitable for forming a sintered cordierite honeycomb structure upon firing as well as an organic pore former material.

The batch composition may additionally comprise one or more processing aids such as, for example, a binder and a liquid vehicle, such as water or a suitable solvent. The processing aids are added to the batch mixture to plasticize the batch mixture and to generally improve processing, reduce the drying time, reduce cracking upon firing, and/or aid in producing the desired properties in the plugged honeycomb body. For example, the binder can include an organic binder. Suitable organic binders include water soluble cellulose ether binders such as methylcellulose, hydroxypropyl methylcellulose, methylcellulose derivatives, hydroxyethyl acrylate, polyvinylalcohol, and/or any combinations thereof. Incorporation of the organic binder into the plasticized batch composition allows the plasticized batch composition to be readily extruded. In some embodiments, the batch composition may include one or more optional forming or processing aids such as, for example, a lubricant which assists in the extrusion of the plasticized batch mixture. Exemplary lubricants can include tall oil, sodium stearate or other suitable lubricants.

After the batch of ceramic precursor materials is mixed with the appropriate processing aids, the batch of ceramic precursor materials is extruded and dried to form a green honeycomb body comprising an inlet end and an outlet end with a plurality of channel walls extending between the inlet end and the outlet end. Thereafter, the green honeycomb body is fired according to a firing schedule suitable for producing a fired honeycomb body. At least a first set of the channels of the fired honeycomb body can then be plugged in a predefined plugging pattern with a ceramic plugging composition and the honeycomb body is dried and/or heated to secure the plugs in the channels.

Figure 12:
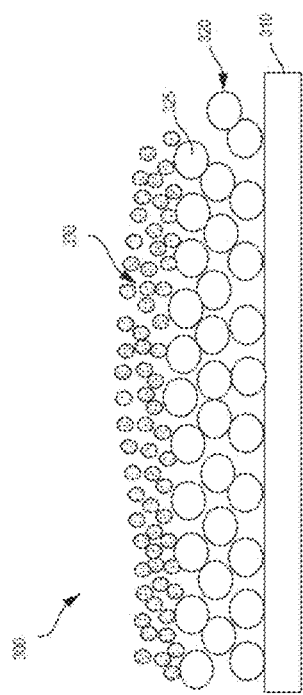
FIG. 12 schematically depicts a wall of a honeycomb body with particulate loading.

In various embodiments the plugged honeycomb body is configured to filter particulate matter from a gas stream, for example, an exhaust gas stream from a gasoline engine. Accordingly, the median pore size, porosity, geometry and other design aspects of both the bulk and the surface of the plugged honeycomb body are selected taking into account these filtration requirements of the plugged honeycomb body. As an example, and as shown in the embodiment of FIG. 12, a wall 310 of the plugged honeycomb body 300, which can be in the form of the particulate filter as shown in FIGS. 10 and 11, has filtration material deposits 320 disposed thereon, which in some embodiments is sintered or otherwise bonded by heat treatment. The filtration material deposits 320 comprise particles 325 that are deposited on the wall 310 of the plugged honeycomb body 300 and help prevent particulate matter from exiting the plugged honeycomb body along with the gas stream 330, such as, for example, soot and/or ash, and to help prevent the particulate matter from clogging the base portion of the walls 310 of the plugged honeycomb body 300. In this way, and according to embodiments, the filtration material deposits 320 can serve as the primary filtration component while the base portion of the plugged honeycomb body can be configured to otherwise minimize pressure drop for example as compared to honeycomb bodies without such filtration material deposits. The filtration material deposits are delivered by the apparatus and deposition methods disclosed herein.

The material, which in some portions or some embodiments may be an inorganic layer, on walls of the plugged honeycomb body is very thin compared to thickness of the base portion of the walls of the plugged honeycomb body. The material, which may be an inorganic layer, on the plugged honeycomb body can be formed by methods that permit the deposited material to be applied to surfaces of walls of the plugged honeycomb body in very thin applications or in some portions, layers. In embodiments, the average thickness of the material, which may be deposit regions or an inorganic layer, on the base portion of the walls of the plugged honeycomb body is greater than or equal to 0.5 µm and less than or equal to 50 µm, or greater than or equal to 0.5 µm and less than or equal to 45 µm, greater than or equal to 0.5 µm and less than or equal to 40 µm, or greater than or equal to 0.5 µm and less than or equal to 35 µm, or greater than or equal to 0.5 µm and less than or equal to 30 µm, greater than or equal to 0.5 µm and less than or equal to 25 µm, or greater than or equal to 0.5 µm and less than or equal to 20 µm, or greater than or equal to 0.5 µm and less than or equal to 15 µm, greater than or equal to 0.5 µm and less than or equal to 10 µm. In one or more embodiments, the inorganic material comprises alumina.

The systems and methods disclosed herein thus provide a rapid and easy way to measure FE, at a much-reduced cost compared to commercially available systems and standards, while at the same time delivering a very accurate and precise measurement.

Reference throughout this specification to "one embodiment," "certain embodiments," "one or more embodiments" or "an embodiment" means that a particular feature, structure, material, or characteristic described in connection with the embodiment is included in at least one embodiment of the disclosure. Thus, the appearances of the phrases such as "in one or more embodiments," "in certain embodiments," "in one embodiment" or "in an embodiment" in various places throughout this specification are not necessarily referring to the same embodiment of the disclosure. Furthermore, the particular features, structures, materials, or characteristics may be combined in any suitable manner in one or more embodiments.

Although the disclosure herein has been described with reference to particular embodiments, those skilled in the art will understand that the embodiments described are merely illustrative of the principles and applications of the present disclosure. It will be apparent to those skilled in the art that various modifications and variations can be made to the method and apparatus of the present disclosure without departing from the spirit and scope of the disclosure. Thus, the present disclosure can include modifications and variations that are within the scope of the appended claims and their equivalents.

What is claimed is:

1. A method of determining a filtration efficiency of a filter comprised of a plurality of intersecting porous walls, the filter having a longitudinal axis extending from an inlet end to an outlet end, and an outer peripheral portion extending parallel to the longitudinal axis and surrounding the plurality of intersecting porous walls, the method comprising:
    sealing the outer peripheral portion to prevent gas flow across an outermost surface of the outer peripheral portion;
    forcing an inlet flow comprised of a gas into the inlet end of the filter at a set flow rate;
    introducing particles into the inlet flow; and
    optically counting the number of particles entering and exiting the filter during a sampling event.

2. The method of claim 1, wherein the particles introduced into the inlet flow have a particle size distribution in a range from 0.2 µm to 2.0 µm with a median particle size of 0.3 µm.

3. The method of claim 1, wherein the particles introduced into the inlet flow have a particle size distribution in a range from 0.2 µm to 2.0 µm, with a peak particle size between 0.2 and 0.4 µm.

4. The method of claim 1, wherein the inlet flow is maintained at a volumetric flow rate which does not vary by more than 10% during the sampling event.

5. The method of claim 4, wherein the gas flow is maintained at greater than 35 Nm^3/hr. and less than 60 Nm^3/hr.

6. The method of claim 1, wherein the gas flow is between 15 deg C and 50 deg C.

7. The method of claim 1, wherein the particles are selected from the group consisting of cigarette smoke particles, atomized particles, liquid particles, nebulized particles, burnt organic powder, and combinations thereof.

8. The method of claim 1, wherein the gas is filtered upstream of the introducing the particles into the inlet flow to remove contaminants from the gas.

9. The method of claim 8, wherein the gas is filtered through a HEPA filter with a 99.97% filtration efficiency for a particle size greater than 0.3 μm.

10. The method of claim 1, wherein the filtration efficiency of the filter is determined from the equation:

$$\mu_e = (n_u - n_d)/n_u,$$

where $\mu_e$=filter efficiency, $n_u$=particles upstream, and $n_d$=particles downstream.

11. The method of claim 1, wherein the plurality of intersecting porous walls comprise porous walls having a bulk porosity of 40 to 75% as measured by mercury porosimetry.

12. The method of claim 1, wherein the plurality of intersecting porous walls comprise porous walls arranged in a honeycomb structure of 100 to 900 cells per square inch.

13. The method of claim 1, wherein the filter has a soot loading of less than 0.1 grams/cubic inch of filter volume, both before, and immediately at the end of, the sampling event.

14. The method of claim 1, wherein the filter is a ceramic filter comprising the plurality of intersecting porous walls, the plurality of intersecting porous walls forming a plurality of channels extending from the inlet end to the outlet end, the plurality of channels comprising a plurality of inlet channels and a plurality of outlet channels, at least some of the inlet channels plugged at or near the outlet end and at least some of the outlet channels plugged at or near the inlet end.

15. The method of claim 1, wherein the sealing comprises inflating a bladder around the peripheral skin.

16. The method of claim 1, wherein the sealing comprises placing the filter in a duct comprising a liner that seals the peripheral skin.

17. A method of determining a filtration efficiency of a ceramic filter, the method comprising:
    positioning the ceramic filter in a duct, the ceramic filter comprising an inlet end and an outlet end, a longitudinal axis extending from the inlet end to the outlet end, a plurality of intersecting porous walls forming a plurality of channels extending from the inlet end to the outlet end, and a peripheral skin layer surrounding the plurality of intersecting porous walls;
    sealing the peripheral skin layer to prevent gas flow across an outermost surface of the peripheral skin layer;
    forcing an inlet flow comprising a gas through the duct and into the inlet end;
    forming particles with a particle generator;
    introducing the particles into the inlet flow, at least some of the introduced particles entering the ceramic filter and at least some of the introduced particles that enter the ceramic filter also exiting the ceramic filter; and
    during a sampling event, optically counting the introduced particles entering the ceramic filter and the introduced particles exiting the ceramic filter.

18. The method of claim 17, wherein the sealing comprises inflating a bladder around the peripheral skin layer.

19. The method of claim 17, wherein the sealing comprises sealing the peripheral skin layer against a liner in the duct.

20. The method of claim 17, further comprising filtering the gas prior to introducing the particles into the inlet flow.

* * * * *